US012504301B2

(12) United States Patent
Eiles et al.

(10) Patent No.: US 12,504,301 B2
(45) Date of Patent: Dec. 23, 2025

(54) INDUCTIVE LINEAR ENCODER WITH GAP ADJUSTMENT

(71) Applicant: Mitutoyo Corporation, Kanagawa-ken (JP)

(72) Inventors: Travis Matthew Eiles, Bothell, WA (US); Andrew Michael Patzwald, Kirkland, WA (US)

(73) Assignee: MITUTOYO CORPORATION, Kanagawa-Ken (JP)

( * ) Notice: Subject to any disclaimer, the term of this patent is extended or adjusted under 35 U.S.C. 154(b) by 200 days.

(21) Appl. No.: 18/472,029

(22) Filed: Sep. 21, 2023

(65) Prior Publication Data

US 2025/0102325 A1   Mar. 27, 2025

(51) Int. Cl.
*G01D 5/20*   (2006.01)

(52) U.S. Cl.
CPC ..................................... *G01D 5/20* (2013.01)

(58) Field of Classification Search
CPC ............................... G01D 5/20; G01D 5/2053
See application file for complete search history.

(56) References Cited

U.S. PATENT DOCUMENTS

| | | |
|---|---|---|
| 5,841,274 A | 11/1998 | Masreliez et al. |
| 5,886,519 A | 3/1999 | Masreliez et al. |
| 5,894,678 A | 4/1999 | Masreliez et al. |
| 5,973,494 A | 10/1999 | Masreliez et al. |
| 6,002,250 A | 12/1999 | Masreliez et al. |
| 6,011,389 A | 1/2000 | Masreliez et al. |
| 6,124,708 A | 9/2000 | Dames |
| 7,116,252 B2 | 10/2006 | Teraguchi |

(Continued)

FOREIGN PATENT DOCUMENTS

| | | |
|---|---|---|
| EP | 0743508 A2 | 11/1996 |
| JP | 2006194720 A | 7/2006 |

(Continued)

OTHER PUBLICATIONS

Collins, "Voice coil actuator basics," Aug. 2016, URL=https://www.linearmotiontips.com/voice-coil-actuator-basics/, retrieved Jun. 13, 2023. (4 pages).

(Continued)

*Primary Examiner* — Akm Zakaria
(74) *Attorney, Agent, or Firm* — Seed Intellectual Property Law Group LLP

(57) ABSTRACT

An inductive linear encoder configured to measure a relative position between two elements along a measuring axis direction includes a scale including a periodic scale pattern and a detector portion configured to move along the measuring axis direction relative to the periodic scale pattern, wherein the detector portion and the scale are separated by a gap. The detector portion includes a field generating portion configured to generate a changing magnetic flux, and a sensing portion configured to provide detector signals which respond to a local effect on the changing magnetic flux provided by adjacent signal modulating elements of the scale pattern. The encoder includes one or more actuators coupled to the detector portion and configured to be electronically controlled to adjust a position of the detector portion so as to adjust the gap based at least in part on the detector signals from the sensing portion.

21 Claims, 16 Drawing Sheets

(56) References Cited

U.S. PATENT DOCUMENTS

| | | |
|---|---|---|
| 8,290,732 B2 | 10/2012 | Teraguchi |
| 9,175,986 B2 | 11/2015 | Kato |
| 9,772,202 B1 | 9/2017 | Cook |
| 9,958,294 B2 | 5/2018 | Cook |
| 10,520,335 B2 | 12/2019 | Cook |
| 10,612,943 B2 | 4/2020 | Cook |
| 10,775,199 B2 | 9/2020 | Cook |
| 11,713,983 B2 | 8/2023 | Cook |
| 2001/0020846 A1* | 9/2001 | Miyata ................ G01D 5/2093 324/207.17 |
| 2013/0248698 A1* | 9/2013 | Ezaki ................ G01D 5/34715 250/231.1 |
| 2017/0153129 A1* | 6/2017 | Sasaki ................ G01D 5/3473 |
| 2019/0018416 A1* | 1/2019 | Gassend ............... G05D 1/0246 |
| 2019/0056247 A1* | 2/2019 | Erlich .................... H02K 41/02 |
| 2020/0003581 A1* | 1/2020 | Cook .................... G01D 5/202 |

FOREIGN PATENT DOCUMENTS

| | | |
|---|---|---|
| JP | 2010048786 A | 3/2010 |
| JP | 2011237231 A | 11/2011 |

OTHER PUBLICATIONS

Mitutoyo America Corporation, "Open Type Absolute Linear Scale ST700 Series," in Digital Scale and DRO Systems, Bulletin 2048, United States, Aug. 2011. (6 pages).

* cited by examiner

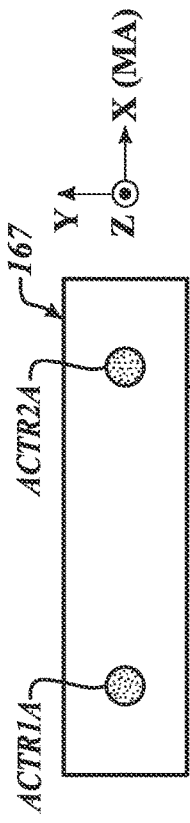
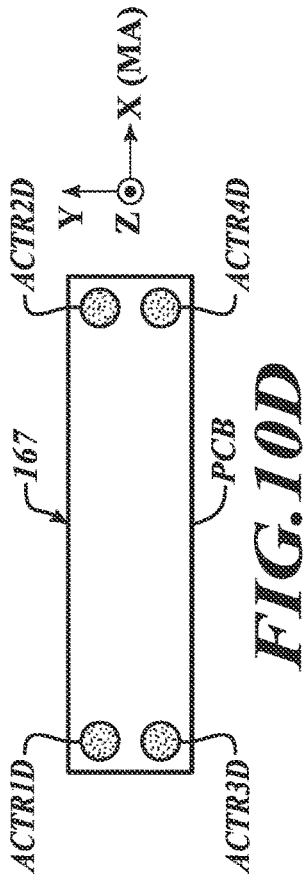
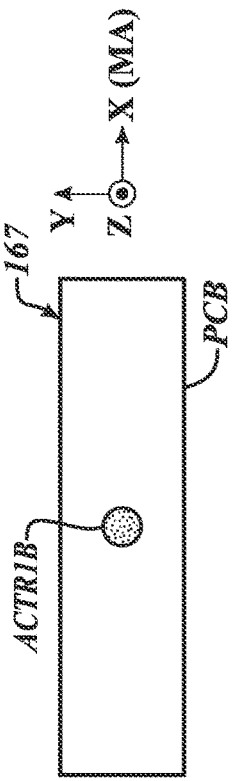
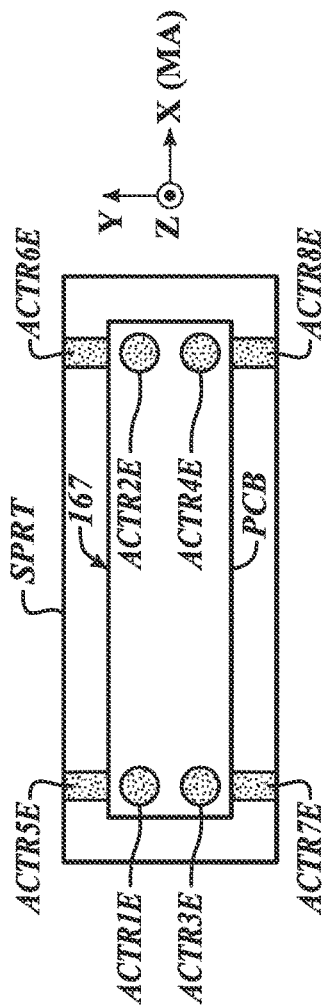
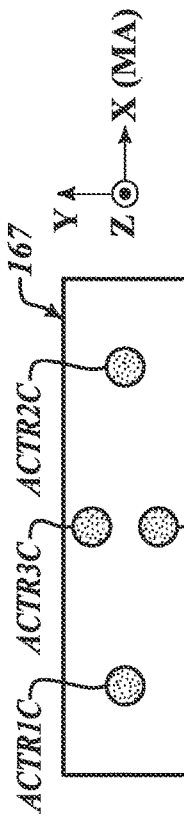

INDUCTIVE LINEAR ENCODER WITH GAP ADJUSTMENT

BACKGROUND

Technical Field

This disclosure relates to metrology and, more particularly, to inductive linear encoders.

Description of the Related Art

Various encoder configurations may include various types of optical, capacitive, magnetic, inductive, movement and/or position transducers. These encoders use various geometric configurations (e.g., of a transmitter and a receiver) in a detector portion (e.g., as included in a readhead) to measure movement between the detector portion and a scale.

U.S. Pat. No. 6,011,389 (the '389 patent) and U.S. Pat. No. 6,124,708 (the '708 patent) describe induced current position transducers usable in high accuracy applications; U.S. Pat. No. 5,973,494 (the '494 patent) and U.S. Pat. No. 6,002,250 (the '250 patent) describe incremental position inductive calipers and linear scales, including signal generating and processing circuits; and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 10,520,335 (the '335 patent), U.S. Pat. No. 10,612,943 (the '943 patent) and U.S. Pat. No. 10,775,199 (the '199 patent) disclose winding configuration refinements that are useful for enhancing the accuracy, robustness, and ease of alignment of inductive encoders. U.S. Pat. No. 7,116,252 (the '252 patent), U.S. Pat. No. 8,290,732 (the '732 patent) and U.S. Pat. No. 9,175,986 (the '986 patent) describe separate-type linear encoders in which the readhead and scale may generally be provided (e.g., to end users) as separate components (e.g., as opposed to being provided together in an integrated unit or device), and each are configured to be attached to different parts (e.g., of a machine), for which a position is to be measured of a first part relative to a second part. All of the foregoing are hereby incorporated herein by reference in their entireties.

As described in these patents, an inductive encoder may be manufactured using printed circuit board (PCB) technology and is largely immune to contamination. However, such systems may be limited in their ability to provide certain combinations of features desired by users, such as combinations of consistency of measurements, ease of use, high accuracy, high resolution, low cost, robustness to contamination, compact size, etc. Configurations of encoders that provide improved combinations of such features would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An inductive linear encoder system is provided, such as a system including a separate-type inductive linear encoder, which is configured to measure a relative position between two elements along a measuring axis direction. The system includes a scale extending along the measuring axis direction which includes a periodic scale pattern comprising signal modulating elements. For example, the periodic scale pattern has a spatial wavelength and has signal modulating elements of a first type comprising similar conductive plates or similar conductive loops that are located along the measuring axis direction corresponding to the spatial wavelength.

The system also includes a detector portion configured to be positioned proximate to the periodic scale pattern and to move along the measuring axis direction relative to the periodic scale pattern. The detector portion and the scale are separated by a gap along a direction which is perpendicular to planes of the detector portion and the scale for example. The detector portion includes a field generating portion which, for example, is fixed on a substrate of a printed circuit board (PCB), and which in some implementations may comprise a field generating element such as a field generating coil surrounding an interior area that is aligned with the periodic scale pattern of the signal modulating elements during operation. The field generating portion is configured to generate a changing magnetic flux, for example in the interior area, in response to a drive signal such as a field generating drive signal.

The detector portion also includes a sensing portion which includes, for example, a set of sensing elements arranged along the measuring axis direction and fixed on the substrate of a PCB. In some implementations, members of the set of sensing elements comprise conductive loops. The sensing portion is configured to provide detector signals which respond to a local effect on the changing magnetic flux provided by adjacent signal modulating elements of the scale pattern. As part of normal measurement operations, the detector signals from the sensing portion may be utilized for determining a position of the detector portion along the measuring axis direction relative to the scale.

The system further includes one or more actuators. As described herein (i.e., and in accordance with common definitions), an actuator is a device that produces a motion by converting energy, such as a mechanical configuration that enables movement. The one or more actuators are coupled to the detector portion and are configured to be electronically controlled to adjust a position of the detector portion, for example along a direction perpendicular to a plane of the scale, so as to adjust the gap between the detector portion and the scale.

In various exemplary embodiments, the system includes a processing portion configured to control the one or more actuators to adjust the gap based at least in part on detector signals from the sensing portion. For example, the processing portion may determine that an amplitude of the detector signals is to be increased (e.g., due to being determined to be too low), and in response to the determination, control the one or more actuators to reduce the gap and correspondingly increase the amplitude of the detector signals.

In various exemplary embodiments, a readhead is provided which includes the detector portion, the one or more actuators, and a support portion (e.g., a case), wherein the one or more actuators are coupled between the support portion and the detector portion. The one or more actuators are configured to adjust a distance between the support portion and the detector portion, to thereby correspondingly adjust the gap between the detector portion and the scale, such that an increase in the distance corresponds to a decrease in the gap, and a decrease in the distance corresponds to an increase in the gap.

In accordance with a further aspect, a method is provided for operating the inductive linear encoder system. The method includes generally three steps of:
    receiving detector signals from the sensing portion;
    determining that the gap between the detector portion and the scale is to be adjusted based at least in part on the detector signals from the sensing portion; and
    controlling the one or more actuators to adjust a position of the detector portion so as to adjust the gap between the detector portion and the scale.

In accordance with a still further aspect, the inductive linear encoder is provided which is configured to measure a relative position between two elements along a measuring axis direction. The inductive linear encoder includes the one or more actuators that are coupled to the detector portion and are configured to be electronically controlled to adjust a position of the detector portion so as to adjust the gap between the detector portion and the scale based at least in part on detector signals from the sensing portion.

BRIEF DESCRIPTION OF THE DRAWINGS

FIGS. 10A-10E are diagrams illustrating implementations with actuators in different relative locations in relation to the detector portion of FIG. 3.

DETAILED DESCRIPTION

Figure 1:
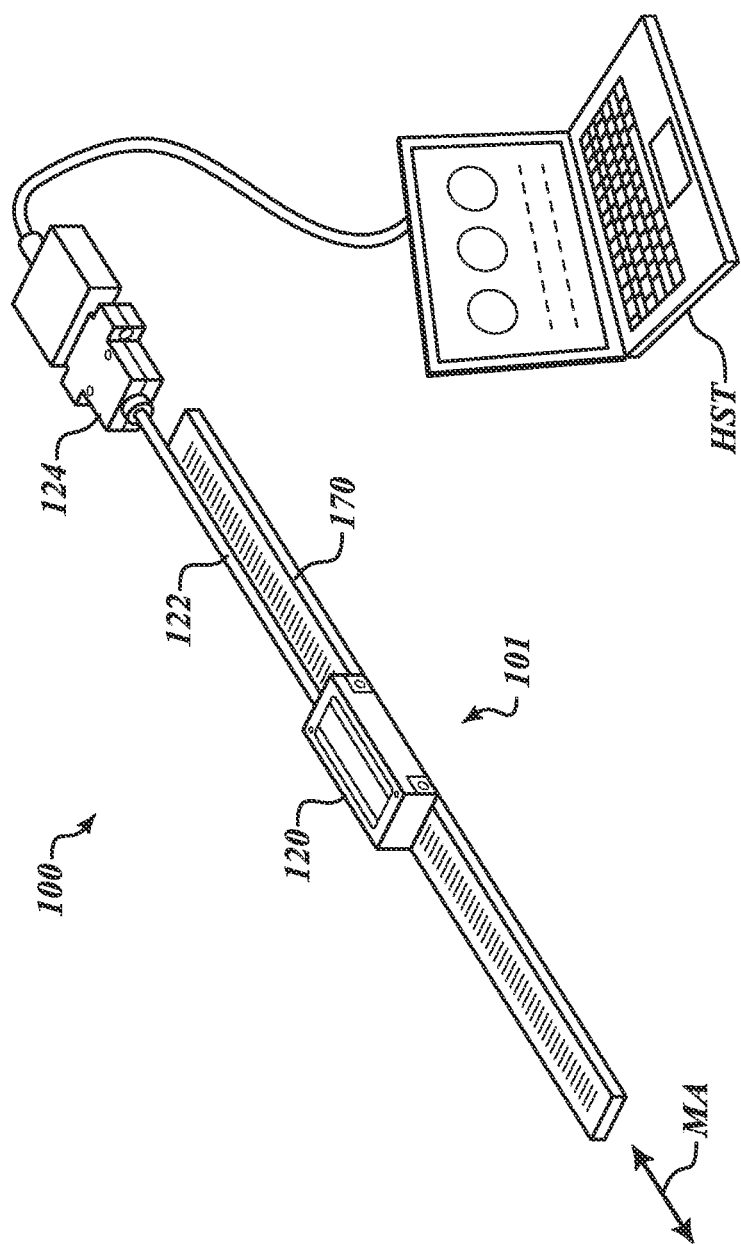
FIG. 1 is a block diagram of exemplary components of an inductive linear encoder system including an inductive linear encoder and a host system.

FIG. 1 is a block diagram of exemplary components of an inductive linear encoder system 100 including a separate-type inductive linear encoder 101. In various implementations, the inductive linear encoder 101 includes a readhead 120 and a scale 170. As will be described in more detail below (e.g., with respect to FIGS. 2 and 3), the readhead 120 may include a detector portion, which in combination with the scale 170 forms a transducer. In various implementations, the readhead 120 is coupled by a cable 122 and a connector 124 to a host system HST (e.g., an external computer, etc.). In certain implementations, the readhead 120 may also or alternatively communicate (e.g., with a host system, etc.) utilizing wireless communications.

The readhead 120 and the scale 170 of the inductive linear encoder 101 work cooperatively to measure a relative position between two elements (e.g., between two parts of a machine that are coupled to the readhead 120 and the scale 170, respectively) along a measuring axis direction MA. In various implementations, the scale 170 extends along the measuring axis direction MA (e.g., corresponding to an x-axis direction) and includes a scale pattern comprising signal modulating elements fabricated on a scale substrate (e.g., using known printed circuit fabrication methods), as will be described in more detail below with respect to FIG. 4. As illustrated, the readhead 120 is positioned proximate to the scale 170 and is moved along the measuring axis direction MA relative to the scale 170.

In certain implementations of separate-type linear encoders such as that of FIG. 1, the readhead 120 and the scale 170 may generally be provided (e.g., to end users) as separate components, as opposed to being provided together in an integrated unit or device, and each are configured to be attached to different parts (e.g., of a machine). Thus, a position may be measured of a first part relative to a second part (e.g., the readhead 120 including a detector portion is attached to the first part and the scale 170 is attached to the second part). Examples of certain previous separate-type linear encoders are illustrated and described in the previously incorporated '252, '732 and '986 patents. For some applications, multiple readheads 120 may be provided/utilized for measuring positions of different parts (e.g., of a machine or machines) that move in relation to another part (e.g., to which the scale 170 is attached).

It will be appreciated that such separate-type linear encoders have evolved over a number of years to provide a relatively optimized combination of high resolution and high accuracy measurements, ease of use, compact size, low power operation, low cost, robustness to contamination, etc. Even small improvements in any of these factors are highly desirable, but difficult to achieve, especially in light of the design constraints imposed in order to achieve commercial success in the various applications. The principles disclosed and claimed herein provide improvements in certain of these factors for various applications.

In particular, to maximize signal levels, it is desirable for a gap between the scale 170 and a detector portion of the readhead 120 to be well controlled (e.g., to produce an optimum signal to noise ratio, for achieving high accuracy measurements, etc.). However, it can be difficult to achieve a desired gap in practice (e.g., in regard to an end user needing to attach or otherwise assemble the corresponding elements, such as when attaching the readhead 120 and the scale 170 to different parts of a machine, and/or if the scale 170 is not mounted flat such as may cause a variation in the gap as the readhead 120 traverses over the scale 170, etc.) To address these issues, in accordance with principles as described herein, a configuration is provided in which the gap is dynamically adjustable by one or more actuators (e.g., by adjusting the position of the detector portion of the readhead 120 relative to the scale 170 so as to thus adjust the gap between the detector portion and the scale 170). As will be described in more detail below, the actuators may be coupled between a support portion (e.g., a case) of the readhead 120 and the detector portion such that the detector portion is coupled to the support portion by the actuators. The actuators may be controlled based at least in part on detector signals from the detector portion (e.g., for which in some implementations a sensed amplitude of the detector signals may indicate whether the gap is to be adjusted). As a specific example, in one implementation if the amplitude of the detector signals is determined to be lower than desired, the actuators may be controlled to adjust the position of the detector portion to be closer to the scale 170 by reducing the gap therebetween, to correspondingly cause the amplitude of the detector signals to increase.

Figure 2:
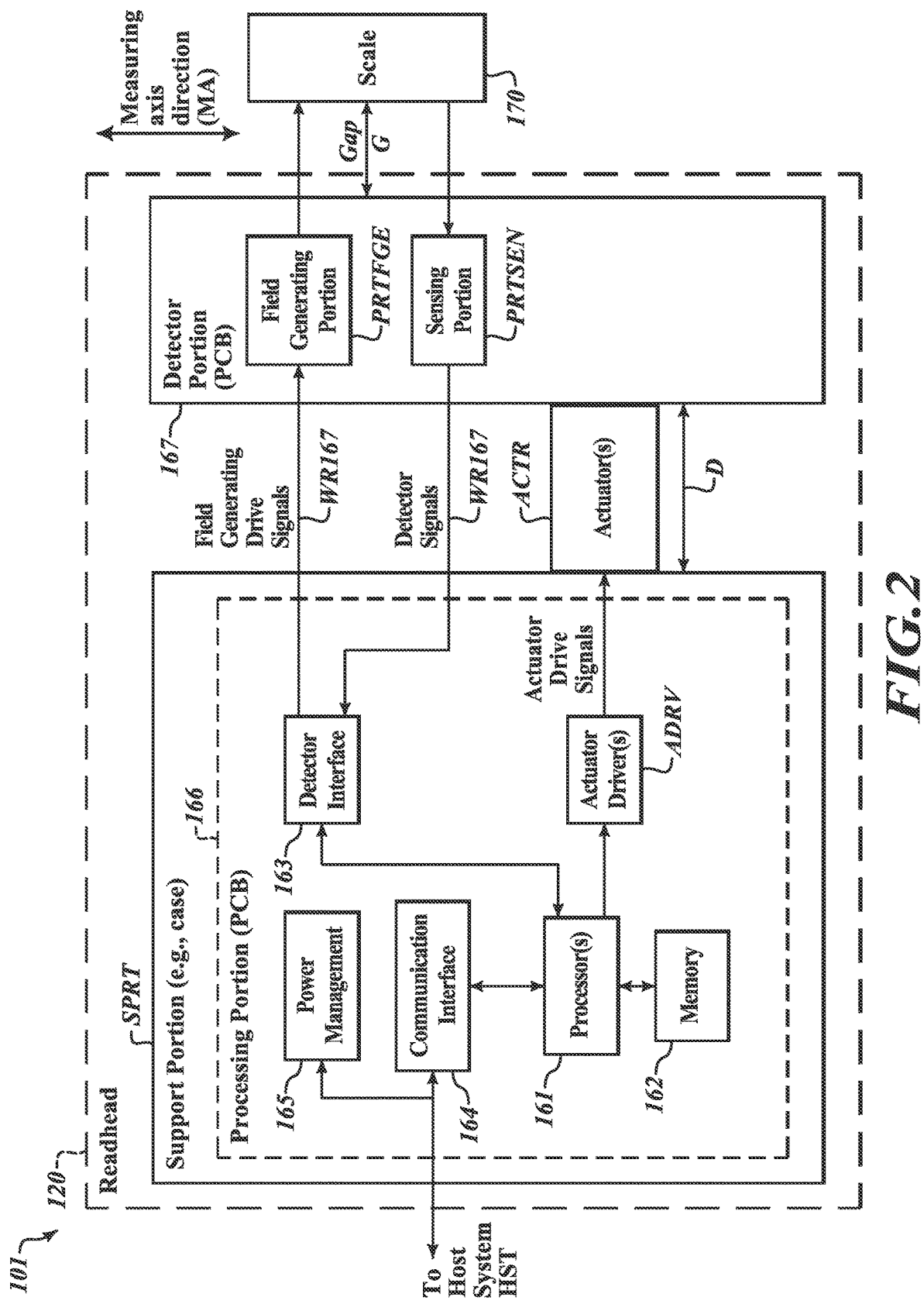
FIG. 2 is a block diagram of an implementation of the inductive linear encoder of FIG. 1 including a scale and a readhead, which includes a detector portion and a processing portion.

FIG. 2 is a block diagram of the separate-type inductive linear encoder 101 of the separate-type inductive linear encoder system 100 of FIG. 1. As illustrated in FIG. 2, the separate-type inductive linear encoder 101 includes the readhead 120 and the scale 170. As will be described in more detail below, in addition to the block representations of certain portions of the inductive linear encoder 101, FIG. 2 also illustrates certain simplified general representations of certain spatial relationships (e.g., including a distance D between a support portion SPRT and a detector portion 167, a gap G between the detector portion 167 and the scale 170, etc.)

As illustrated in FIG. 2, the readhead 120 includes a processing portion 166 as attached to a support portion SPRT (e.g., a case), one or more actuators ACTR, and a detector portion 167. As will be described in more detail below, the detector portion 167 includes a field generating portion PRTFGE and a sensing portion PRTSEN. In accordance with principles as described herein, the one or more actuators ACTR couple the detector portion 167 to the support portion SPRT, and enable adjustments of a distance D between the detector portion 167 and the support portion SPRT, and correspondingly enable adjustments of a gap G between the detector portion 167 and the scale 170.

In various implementations, the processing portion 166 includes one or more processors 161, a memory 162, a detector interface 163, a communication interface 164, a power management portion 165 and one or more actuator driver(s) ADRV. In various implementations, the memory 162 is coupled to the one or more processors 161 and stores program instructions that when executed by the one or more processors 161 cause the one or more processors 161 to perform various functions/operations including functions/operations of the detector interface 163, communication interface 164, power management portion 165, one or more actuator driver(s) ADRV, and/or other functions/operations as described herein.

Those skilled in the art will appreciate that the processing portion 166, detector portion 167 and/or host system HST (and/or any other control systems or control portions as described herein) may generally be implemented using any suitable computing devices and/or systems, including distributed or networked computing environments, and the like. Such computing devices and/or systems may include one or more general purpose or special purpose processors (e.g., non-custom or custom devices) that execute software to perform the functions described herein. Software may be stored in memory, such as random access memory (RAM), read only memory (ROM), flash memory, or the like, or a combination of such components. Software may also be stored in one or more storage devices, such as optical based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing devices or systems and accessed via service calls, either in a wired or wireless configuration.

The detector interface 163 is coupled to the one or more processors 161, and provides field generating drive signals to the field generating portion PRTFGE and receives detector signals from the sensing portion PRTSEN, as will be described in more detail below (e.g., with respect to FIGS. 3 and 7A-7C). In various implementations, the detector interface 163 may be located on a printed circuit board (PCB) of the processing portion 166 as illustrated in FIG. 2, or on a PCB of the detector portion 167 (e.g., depending on a desired amount of protection from certain environmental factors, etc.) In various implementations, as indicated in FIG. 2, the processing portion 166 and the detector portion 167 may be included on different separate PCBs and/or other substrates (e.g., thus enabling the physical position of the detector portion 167 to be adjusted, such as by the one or more actuators ACTR, in relation to the support portion SPRT to which the processing portion 166 is attached).

The actuator driver(s) ADRV is/are coupled to the one or more processors 161, and provide(s) actuator drive signals. As will be described in more detail below, the one or more processors 161 control the actuator driver(s) ADRV to provide the actuator drive signals for controlling the one or more actuators ACTR based at least in part on the detector signals from the sensing portion PRTSEN (e.g., based at least in part on the amplitudes of the detector signals). For example, in one implementation if the amplitudes of the detector signals are to be increased, the one or more actuators ACTR may be controlled to increase the distance D and correspondingly reduce the gap G, which may correspondingly increase the amplitude of the detector signals (e.g., due to the field generating portion PRTFGE and the sensing portion PRTSEN of the detector portion 167 being closer to the signal modulating elements SME of the scale 170 such that the signal modulating elements SME may have a greater effect on the magnetic flux as may result in higher amplitude signals, as will be described in more detail below with respect to FIGS. 7A-7C, 8A, 8B, 9A and 9B). In certain other instances, it may be desirable for the actuators ACTR to be utilized to decrease the distance D and correspondingly increase the gap G (e.g., if the signals are saturated and/or there is danger of mechanical contact/zero gap due to the signal modulating elements SME of the scale 170 being too close to the detector portion 167, etc.)

The communication interface 164 may provide/receive signals to/from the host system HST (e.g., including an external computer such as illustrated in FIG. 1). For example, in an implementation where the separate-type inductive linear encoder 101 is utilized to measure a position of a first machine part that moves in relation to a second machine part (e.g., to which the readhead 120 and the scale 170 are respectively coupled), the host system HST may receive the measurement data/signals that indicate the position of the first machine part in relation to the second machine part (e.g., and may display or otherwise utilize such data/signals for additional processing, etc.). In various implementations, the power management portion 165 includes and/or is coupled to a power supply (e.g., such as from the host system HST, and which provides power for the operations of the processing portion 166, etc.)

As part of normal measurement operations, the detector signals from the sensing portion PRTSEN may be utilized for determining a position of the detector portion 167 of the readhead 120 along the measuring axis MA relative to the scale 170, as will be described in more detail below. As noted above, such detector signals may be received and/or processed by the detector interface 163 and/or one or more processors 161 for determining the position.

As shown in FIG. 2, the detector portion 167 may include the field generating portion PRTFGE and the sensing portion PRTSEN. The detector portion 167 may be arranged parallel with and facing the scale 170, and a front face of the detector portion 167 that faces the scale 170 may be separated from the scale 170 (and/or a scale pattern) by the gap G (e.g., along a z-axis direction perpendicular to planes of the detector portion 167 and the scale 170). For example, in some implementations it may be desirable for the gap G to be of a particular gap size (e.g., on the order of 0.5 mm or otherwise) after adjustment in accordance with principles as described herein.

Figure 3:
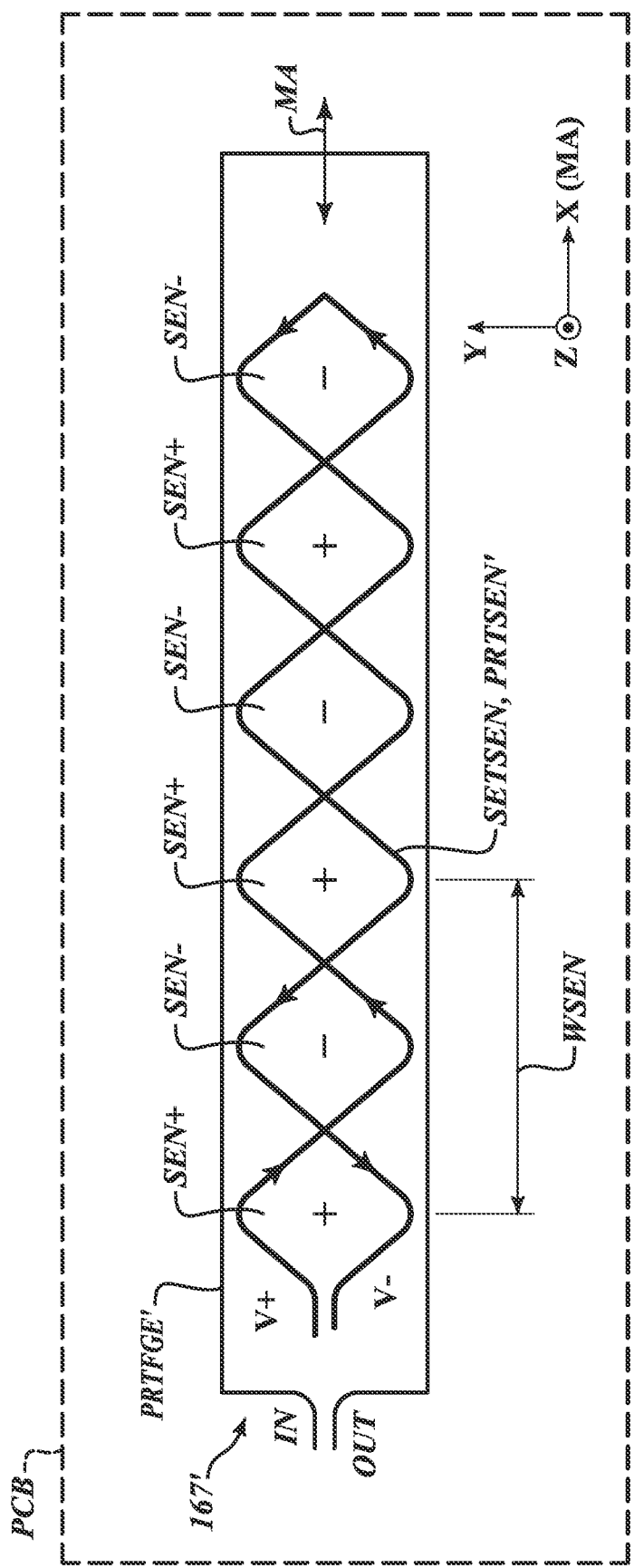
FIG. 3 is a diagram of an implementation of the detector portion of FIG. 2.

FIG. 3 is a diagram of a detector portion 167' including a field generating portion PRTFGE' and a sensing portion PRTSEN' (e.g., which may be particular implementations of the detector portion 167, the field generating portion PRTFGE and the sensing portion PRTSEN as described above with respect to FIGS. 1 and 2). In the simplified example of FIG. 3, the detector portion 167' includes at least two substantially coplanar paths of wire or windings (PRTFGE' and PRTSEN'). The field generating portion PRTFGE' includes a field generating winding (e.g., which in some implementations may also be referenced as a transmitter winding or a transmitter coil) which forms a large planar loop. The sensing portion PRTSEN' includes a set of sensing elements SETSEN including sensing elements SEN+ and SEN− formed by a sensing winding (e.g., which in some implementations may also or alternatively be referred to as a receiver winding or a receiver coil), in substantially the same or a very near parallel plane as the field generating winding of the field generating portion PRTFGE' (e.g., such as on adjacent or otherwise very close layers of a PCB).

The sensing winding of the sensing portion PRTSEN' is laid out in one direction as indicated by the arrows in a zig-zag or sinusoidal pattern and then in a reverse direction as indicated by the arrows so that the winding crosses over itself (e.g., with insulation and/or on different PCB layers at the crossover points to avoid short circuits) to form alternating loops which are designated as the sensing elements SEN+ and SEN− interposed between each other, as shown. As a result, each of the alternating loops of the sensing elements SEN+ and SEN− of the set of sensing elements SETSEN have a different winding direction as compared to adjacent loops. By applying an alternating (changing) current to the field generating portion PRTFGE', the field generating winding produces a time-varying magnetic field (a changing magnetic flux), extending through the loops of the sensing elements SEN+ and SEN− of the set of sensing elements SETSEN of the sensing portion PRTSEN'.

Figure 4:
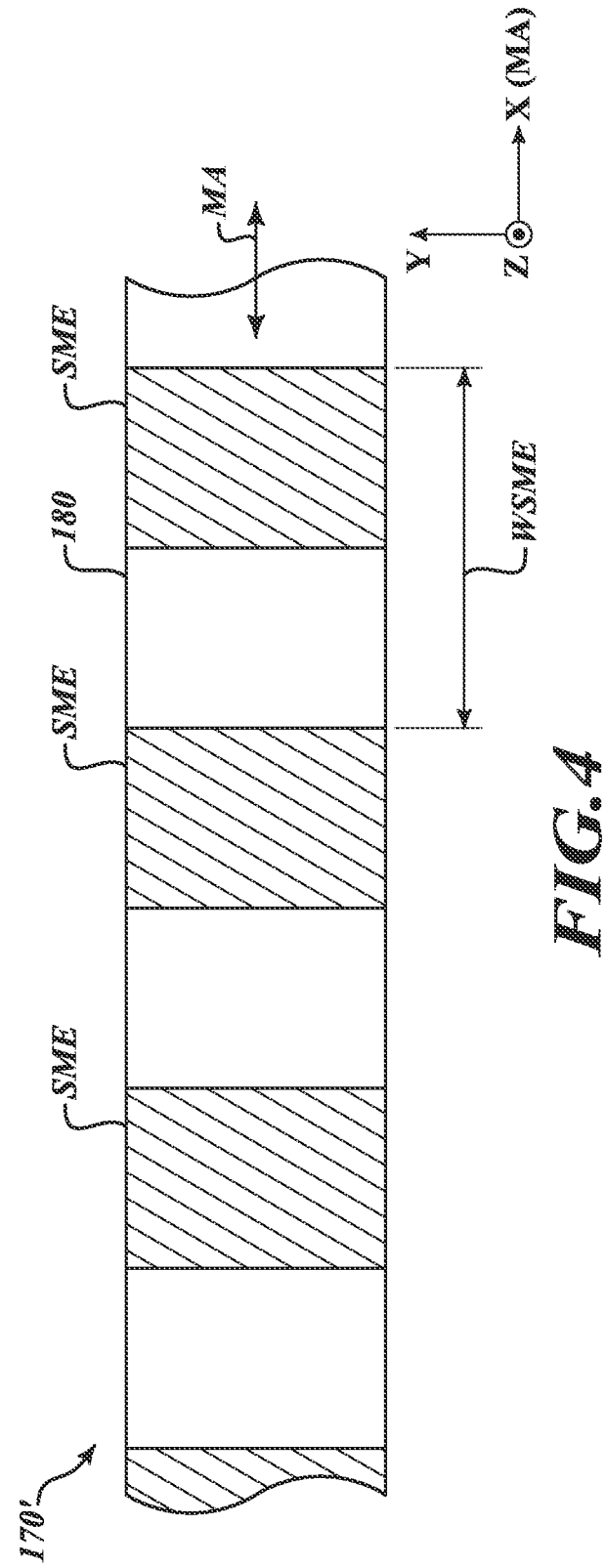
FIG. 4 is a diagram of an implementation of the scale of FIG. 2.

FIG. 4 is a diagram of a portion of a scale 170' (e.g., which may be an implementation of the scale 170 of FIGS. 1 and 2) extending along the measuring axis direction MA. The scale 170' includes a periodic scale pattern 180 comprising signal modulating elements SME. In various implementations, the periodic scale pattern 180 has a spatial wavelength WSME and has signal modulating elements SME of a first type comprising similar conductive plates (as indicated by diagonal hatching in FIG. 4) that are located along the measuring axis direction MA corresponding to the spatial wavelength WSME.

As a principle of operation, if the scale 170' of FIG. 4 including the scale pattern 180 with the signal modulating elements SME is moved close (proximate) to the detector portion 167' of FIG. 3, the varying magnetic field generated by the field generating portion PRTFGE' will induce eddy currents in the proximate signal modulating elements SME, which in turn sets up a magnetic field from the signal modulating elements SME that counteracts the varying magnetic field (the changing magnetic flux). As a result, the magnetic flux that the sensing winding of the sensing portion PRTSEN' receives is altered or disrupted, thereby causing the sensing winding to output a non-zero electromagnetic field (EMF) signal (a voltage) at the output terminals V+ and V− of the sensing winding of the sensing portion PRTSEN', which will change polarity as the signal modulating elements SME move between being aligned with the "+" and "−" loops of the sensing elements SEN+ and SEN−.

The distance between the location of two sensing elements of the same polarity, (e.g., between the location of sensing element SEN+ to the location of the next sensing element SEN+) is defined as a pitch or wavelength WSEN of the set of sensing elements SETSEN of the sensing portion PRTSEN', and in certain implementations may be equal to a pitch or wavelength WSME of the scale pattern 180 of the scale 170'. It may be seen that each sensing element SEN+ and SEN− therefore has a length or maximum dimension 0.5*WSEN along the measuring axis direction MA. As will be described in more detail below with respect to FIGS. 7A-7C, if the signal modulating elements SME (e.g., conductive plates) that are proximate to the sensing portion PRTSEN' are continuously varied in position along the measuring axis direction MA, the alternating current (AC) amplitude of the signal output from the sensing portion PRTSEN' will vary continuously and periodically with the wavelength WSME due to the periodic alteration of the sensing elements SEN+ and SEN− and local disruption of the transmitted magnetic field caused by the signal modulating elements SME. The signal output from the sensing portion PRTSEN' may thus be utilized (e.g., processed) to indicate a relative position between the detector portion 167' and the scale 170'.

During operations, alternating current may be provided, although in order to simplify certain parts of the description herein only one direction of current is described (e.g., for purposes of example of one direction of current and/or as may occur in configurations where diodes or other components/configurations are provided to limit the current flow to one direction). As one example, current (e.g., as provided by field generating drive signals) may flow through the field generating winding of the field generating portion PRTFGE' from the "IN" terminal to the "OUT" terminal. More specifically, this indicates a current flow in a clockwise direction, which generates a corresponding magnetic flux, for example, within an interior area which is aligned with the sensing portion PRTSEN'. As noted above, such current flow (e.g., with the resulting magnetic flux as affected by the signal modulating elements SME) results in generated signals in sensing elements SEN+ and SEN− in the sensing portion PRTSEN', as will be described in more detail below with respect to FIGS. 7A-7C.

Figure 5:
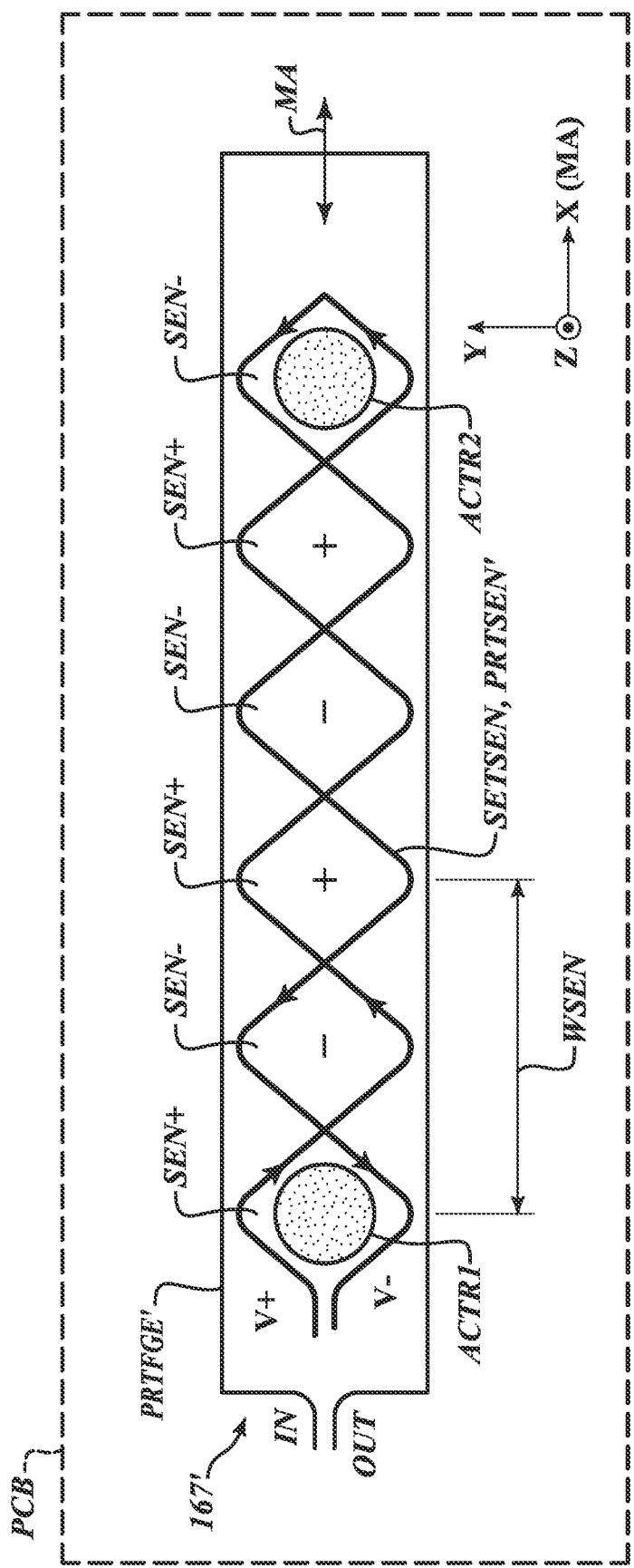
FIG. 5 is a diagram illustrating relative locations of actuators in an implementation of the detector portion of FIG. 3.
Figure 6:
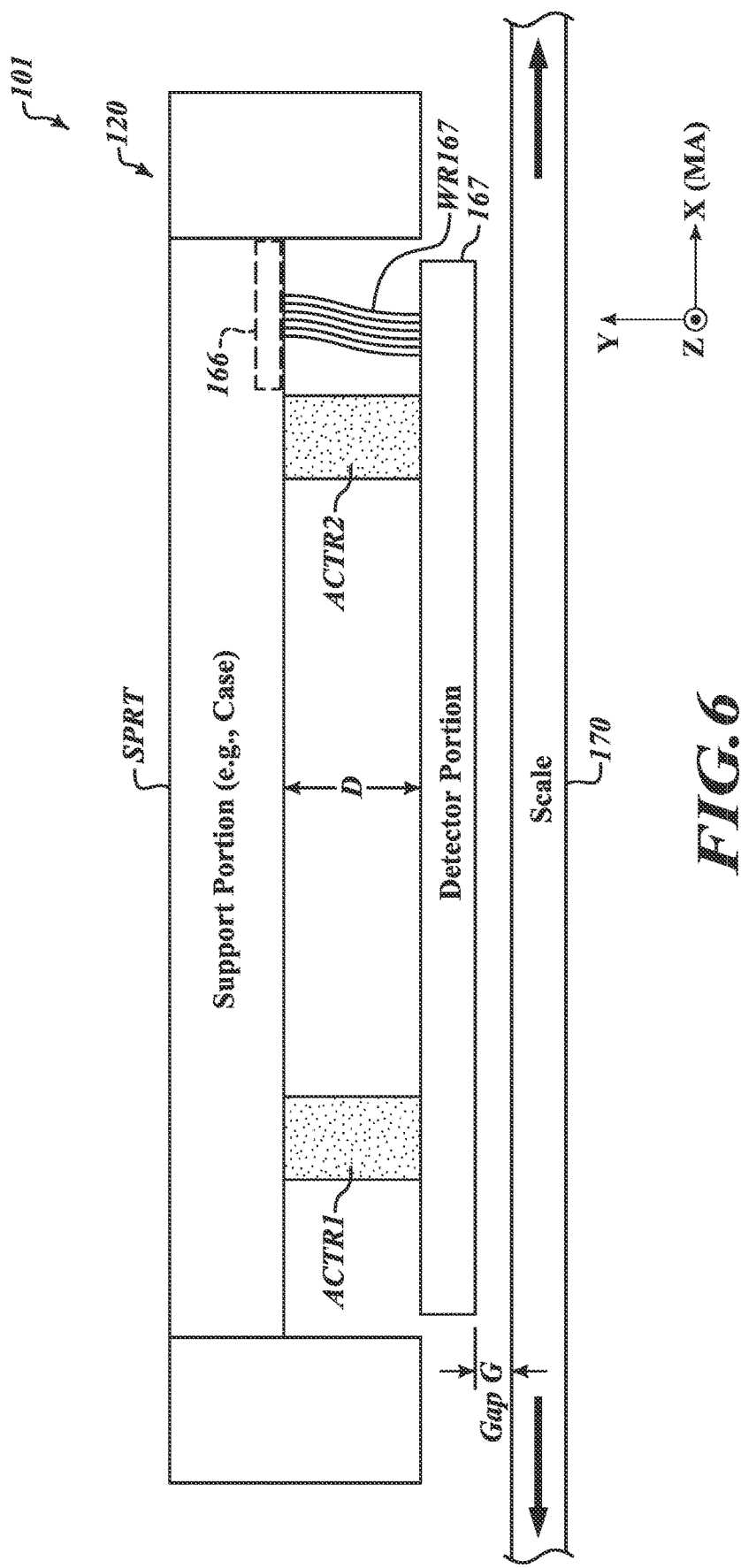
FIG. 6 is a side-view diagram of an implementation of the inductive linear encoder of FIG. 2 including an implementation of the actuators of FIG. 5.

FIG. 5 is a diagram illustrating relative locations of actuators ACTR in an implementation of the detector portion of FIG. 3 (e.g., and as further illustrated in FIG. 6). As illustrated, two actuators ACTR1 and ACTR2 may be provided near the ends of the sensing portion PRTSEN' along the measuring axis direction MA. In other implementations, one actuator or three or more actuators may be provided (e.g., as will be described in more detail below with respect to FIGS. 10A-10E), though in various implementations two actuators ACTR1 and ACTR2 may be sufficient to provide a robust mechanism to perform gap adjustment needed between the detector portion 167 and the scale 170. Each actuator ACTR is a device that produces motion by converting energy, and may be any component that enables movement to adjust a position of the detector portion 167 (e.g., along a direction perpendicular to a plane of the scale 170) so as to adjust the gap G between the detector portion 167 and the scale 170. Non-limiting examples of the actuator ACTR include voice coil elements and other electromagnetic actuators, etc.

FIG. 6 is a diagram of an implementation of the inductive linear encoder 101 of FIG. 2 including an implementation of the actuators ACTR1 and ACTR2 of FIG. 5. The inductive linear encoder 101 includes the readhead 120 including the support portion SPRT (e.g., case), the processing portion 166, the detector portion 167, and the actuators ACTR1 and ACTR2. In this example, the processing portion 166 is included in or otherwise attached to a horizontal portion of the support portion SPRT, for which the support portion SPRT further includes side portions which extend vertically downward (e.g., and which in some implementations may extend downward on all sides to at least partially or fully surround at least part or all of the actuators ACTR and/or the detector portion 167). The processing portion 166 is coupled to the detector portion 167 via wires WR167 (see also, FIG. 2) to send the field generating drive signals to the field generation portion PRTFGE of the detection portion 167 and to receive the detector signals from the sensing portion PRTSEN of the detector portion 167.

FIG. 6 is a side view to illustrate the positional relationships along the z-axis direction between the support portion SPRT, the actuators ACTR1, ACTR2, the detector portion 167, the scale 170, and the gap G between the detector portion 167 and the scale 170. As illustrated, the actuators ACTR1, ACTR2 are coupled between the support portion SPRT and the detector portion 167 such that the actuators ACTR1, ACTR2 are configured to adjust a distance D between the support portion SPRT and the detector portion 167, to correspondingly adjust the gap G between the detector portion 167 and the scale 170. For example, an increase in the distance D between the support portion SPRT and the detector portion 167 corresponds to a decrease in the gap G between the detector portion 167 and the scale 170, and a decrease in the distance D between the support portion SPRT and the detector portion 167 corresponds to an increase in the gap G between the detector portion 167 and the scale 170.

Figure 7A:
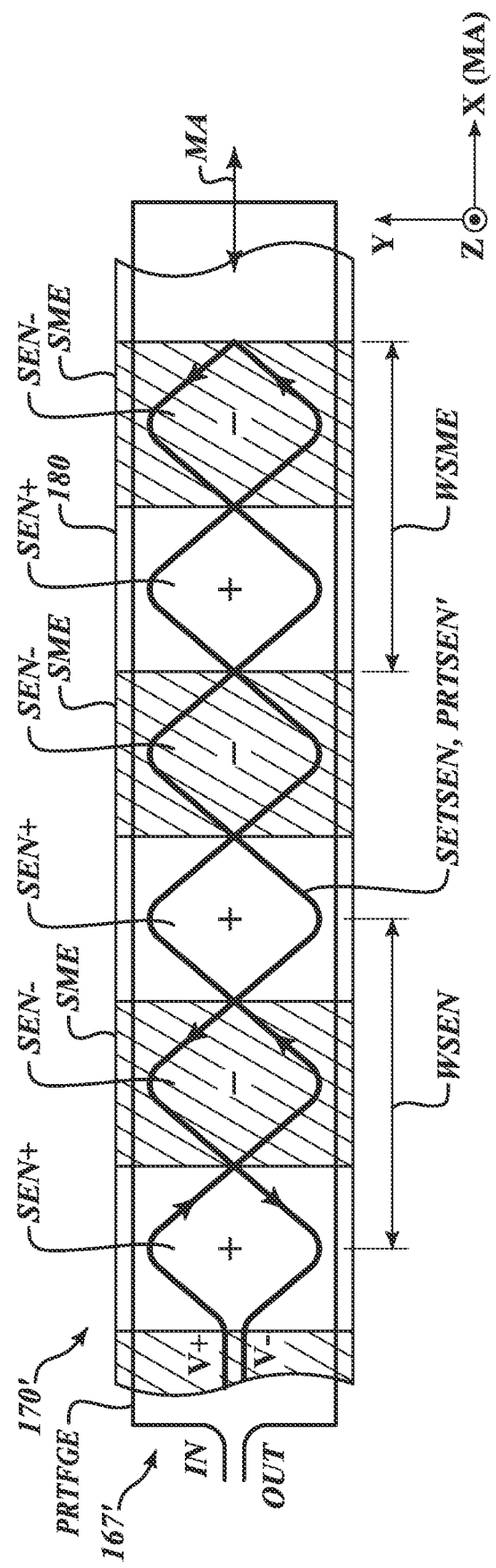
FIGS. 7A-7C are diagrams illustrating operations of the detector portion of FIG. 3.
Figure 7B:
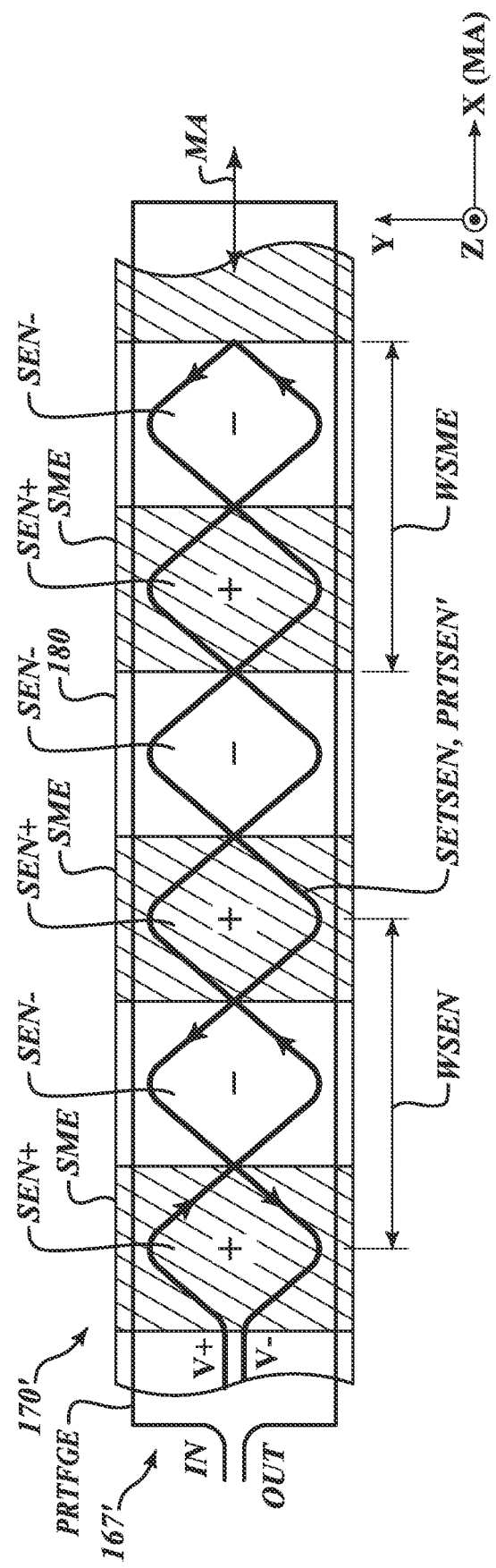
Figure 7C:
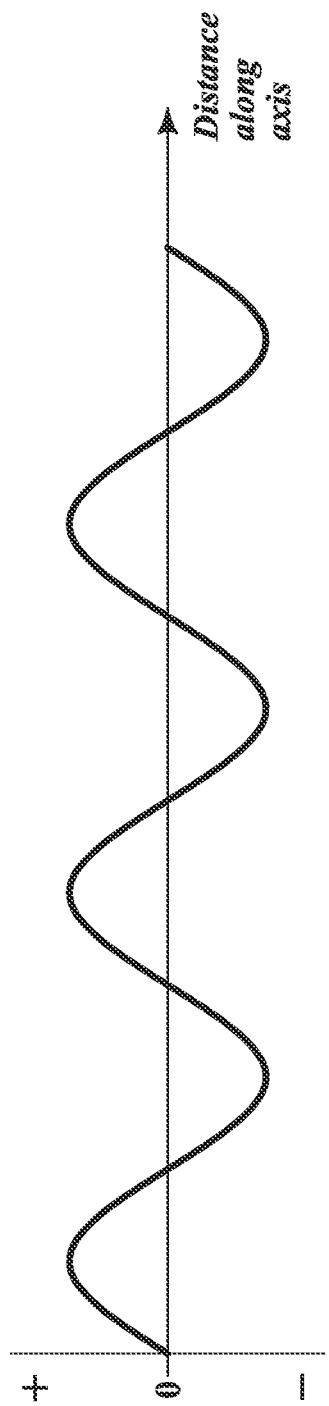

FIGS. 7A, 7B and 7C show an example of how the inductive linear encoder 101 operates, and more specifically illustrate operations of the detector portion 167' of FIG. 3. As the scale 170' and its signal modulating elements SME move with respect to the detector portion 167', the signal modulating elements SME alternatively cover or are placed in proximal relation to all of the "+" loops of the sensing elements SEN+ or all of the "−" loops of the sensing elements SEN−. As shown in FIG. 7A, the signal modulating elements SME are proximate to, or "overlap" (e.g., as aligned with), all of the "−" loops of the sensing elements SEN− in the sensing portion PRTSEN'.

As the field generating winding of the field generating portion PRTFGE inductively couples to, and induces eddy currents in, the signal modulating elements SME, the signal modulating elements SME produce a magnetic field that counteracts the magnetic field passing through the sensing elements SEN−. The sensing elements SEN−, therefore, generate less induced electromagnetic field (EMF) than the sensing elements SEN+, which fully receive the flux from the magnetic field. Consequently, in this example, the sensing portion PRTSEN' produces a net "positive" polarity EMF, current, and/or voltage, at its output. The output signal varies with time because the field generating portion PRTFGE generates a time-varying magnetic field. The amplitude and polarity of the time varying output signal, relative to the input signal, provides an indication of position between the readhead 120 and the scale 170'.

FIG. 7C shows an example of how the output amplitude varies with the position of the scale 170' relative to the readhead 120 (e.g., and for which the waveform of FIG. 7C may be characterized as a "relative position signal"). The initial peak in the waveform of FIG. 7C is an example of a "positive polarity" amplitude output from the V+ and V− terminals of the sensing portion PRTSEN' of FIG. 7A. "Polarity" indicates the time phase of the time-varying output signal relative to the input signal; in various implementations it may either be in phase or inverted (180° out of phase) relative to the input signal.

Alternatively, as shown in FIG. 7B, as the scale 170' is moved so that the signal modulating elements SME overlap (e.g., are aligned with) the "+" loops of the sensing elements SEN+, the induced current generated in the signal modulating elements SME counteracts the flux of the magnetic field passing through the "+" loops of the sensing elements SEN+. As a result, the sensing elements SEN− generate more induced EMF than the sensing elements SEN+. Consequently, the sensing portion PRTSEN' generates a net "negative" polarity EMF, current and/or voltage at its output. The initial valley in the waveform of FIG. 7C shows an example of a negative polarity amplitude output from the V+ and V terminals of the sensing portion PRTSEN' of FIG. 7B.

Thus, when the signal modulating elements SME completely overlap (e.g., are aligned with) the "−" loops of the sensing elements SEN− as shown in FIG. 7A, the resulting output signal has a maximum positive amplitude as shown in the peaks in the waveform of FIG. 7C. Conversely, when the signal modulating elements SME completely overlap (e.g., are aligned with) the "+" loops of the sensing elements SEN+ as shown in FIG. 7B, the resulting output signal has a maximum negative amplitude as shown in the valleys in the waveform of FIG. 7C.

As the sensing portion PRTSEN' moves along the measuring axis direction MA from the position shown in FIG. 7A to the position shown in FIG. 7B, when the signal modulating elements SME overlap (e.g., are aligned with) exactly half of the area of each of the "+" and "−" loops of the sensing elements SEN+ and SEN−, the resulting output signal has an amplitude of zero as shown for the zero values in the waveform of FIG. 7C in between the maximum positive amplitudes and the maximum negative amplitudes. Thereafter, as the sensing portion PRTSEN' moves more closely to the position shown in FIG. 7B, the amplitude of the output signal has an increasing negative value. Similarly, as the sensing portion PRTSEN' moves along the measuring axis direction MA from the position shown in FIG. 7B to the position shown in FIG. 7A, when the signal modulating elements SME overlap (e.g., are aligned with) exactly half of the area of each of the "−" and "+" loops of the sensing elements SEN− and SEN+, the resulting output signal has an amplitude of zero as shown for the zero values in the waveform of FIG. 7C in between the maximum negative amplitudes and the maximum positive amplitudes. Thereafter, as the sensing portion PRTSEN' moves more closely to the position shown in FIG. 7A, the amplitude of the output signal has an increasing positive value.

It will be appreciated that the amplitudes of the signals may be related at least in part to the gap (e.g., along the z-axis direction) between the signal modulating elements SME of the scale 170' and the detector portion 167'. More specifically, in at least some instances at certain distances, the amplitudes of the signals may increase if the gap is decreased (i.e., if the detector portion 167' is moved closer to the signal modulating elements SME where the signal modulating elements SME may have a greater effect on the magnetic fields/flux in accordance with the principles as described above). As will be described in more detail below (e.g., with respect to FIGS. 8A, 8B, 9A and 9B), in accordance with principles as described herein, in various implementations one or more actuators ACTR may be utilized to adjust the gap to achieve a desired amplitude of the detector signals.

In one example, the circuitry of the processing portion 166 (e.g., including the detector interface 163 and the one or more processors 161) is coupled to the terminals V+ and V− of the sensing portion PRTSEN' (e.g., for receiving the detector signals) and samples the changes in the signal output from the sensing portion PRTSEN' (e.g., either voltage or current changes) and thereby computes linear position/distance of the readhead 120 including the detector portion 167' along the scale 170'. Although FIGS. 3, 7A and 7B show a single set of sensing elements for simplicity and to avoid visual confusion, in various implementations the sensing portion PRTSEN includes one or more additional sets of sensing elements (e.g., similar to SETSEN) at different spatial phase positions (e.g., to provide quadrature signals), as will be understood by one of ordinary skill in the art. In addition, in various implementations one or more additional scale tracks are included as part of the scale 170, along with one or more additional corresponding sets of sensing elements (SETSEN1, SETSEN2, etc.) of the sensing portion PRTSEN (e.g., with wavelengths of each scale track set differing from WSME and WSEN, for which processing of the signals in combination may provide an absolute measurement, etc.) Certain examples of such principles are described in part in U.S. Pat. Nos. 9,772,202 and 11,713,983, each of which is hereby incorporated herein by reference in its entirety.

It will also be appreciated that the configurations of sensing elements described herein are intended to be exemplary only, and not limiting. As one example, individual sensing element loops may output individual signals to a corresponding signal processing configuration in some implementations, for example as disclosed in U.S. Pat. No. 9,958,294, which is hereby incorporated herein by reference in its entirety. More generally, various known sensing element configurations may be used in combination with the principles disclosed and claimed herein, for use in combination with various known scale pattern and signal processing schemes, in various implementations.

In relation to such implementations, it will be appreciated that references herein to determining the strength and/or amplitude of the detector signals from the sensing portion PRTSEN of the detector portion 167 may include processing and/or combining signals from different sets of sensing elements (e.g., in quadrature and/or from different scale tracks, etc.). For example, in certain implementations while a detector signal from a single set of sensing elements will vary depending on position, detector signals from multiple sets of sensing elements (e.g., with different spatial phase positions, wavelengths, etc.) may be combined or otherwise processed in such a way as to determine an overall strength/amplitude of the combined signals (e.g., in a way that may be relatively independent of the position of the detector portion 167 and correspondingly the readhead 120 along the scale 170). In addition or alternatively, certain techniques may be utilized for determining the relative strength and/or amplitude of detector signals from the sensing portion PRTSEN (e.g., sampling or otherwise measuring the detector signals as the detector portion 167 and the readhead 120 are moved over a range of positions along the scale 170 and/or as are moved to a specified calibration position or positions, etc.).

The scale 170 and detector portion 167 and/or other elements as described herein may be readily manufactured by conventional techniques. For example, known printed circuit board (PCB) techniques (on rigid or flexible substrates) can be used to manufacture the detector portion 167 by forming the field generating portion PRTFGE and the sensing portion PRTSEN (e.g., including the windings thereof) on a PCB substrate. Appropriate insulation and/or elements or portions of different elements on different layers of the PCB may be included at transition points between the "+" and "−" loops of the sensing elements SEN+ and SEN− where the sensing portion PRTSEN crosses over itself, in order to prevent short circuiting of the winding at the transition or cross-over points. Similarly, known PCB techniques can be used to manufacture the scale 170 by forming the signal modulating elements SME on a PCB substrate.

Figure 8A:
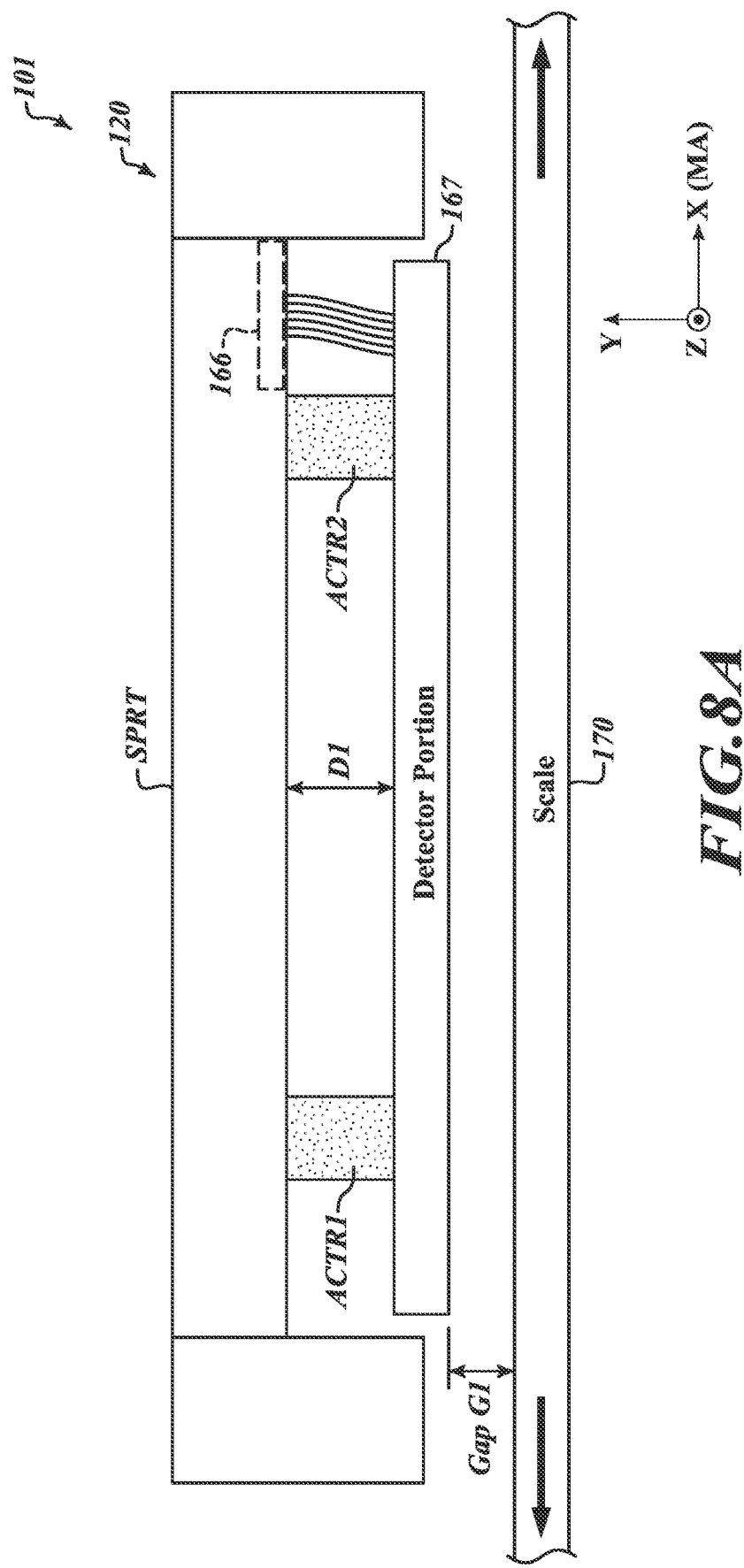
FIGS. 8A and 8B are diagrams illustrating operations of the inductive linear encoder of FIG. 6 with a gap having a first gap size between the detector portion and the scale.
Figure 8B:
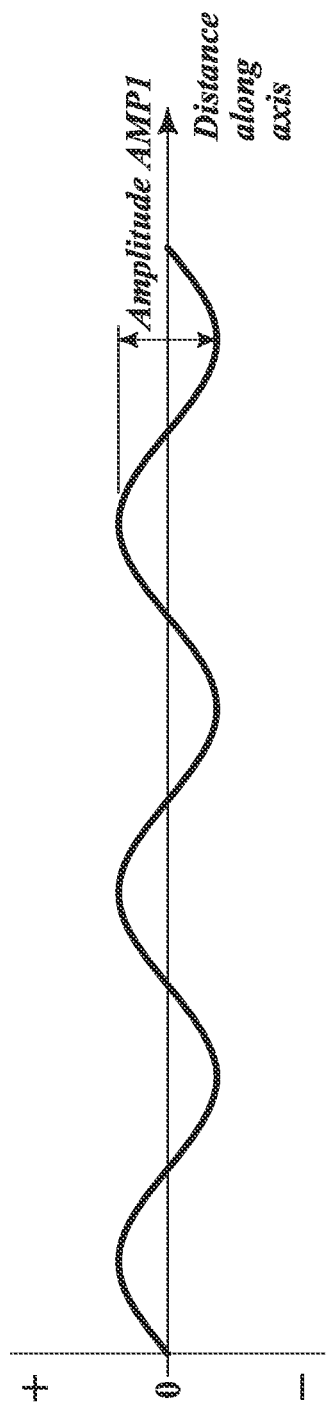

FIGS. 8A and 8B are diagrams illustrating operations of the inductive linear encoder 101 of FIG. 6 with a gap having a first gap size G1 between the detector portion 167 and the scale 170. As illustrated, the inductive linear encoder 101 includes the readhead 120 including the support portion SPRT, and the actuators ACTR1, ACTR2 are provided between the support portion SPRT and the detector portion 167 to control/adjust the distance between the support portion SPRT and the detector portion 167 to be at a first distance dimension D1, to correspondingly achieve the gap having the first gap size G1 between the detector portion 167 and the scale 170. Correspondingly, FIG. 8B shows how an output amplitude (e.g., similar to FIG. 7C and thus corresponding to a relative position signal) varies with the position of the scale 170 relative to the readhead 120, for which the relative position signal is shown to have a first amplitude AMP1 when the scale 170 and the detector portion 167 in the readhead 120 is separated by the gap having the first gap size G1 as shown in FIG. 8A.

Figure 9A:
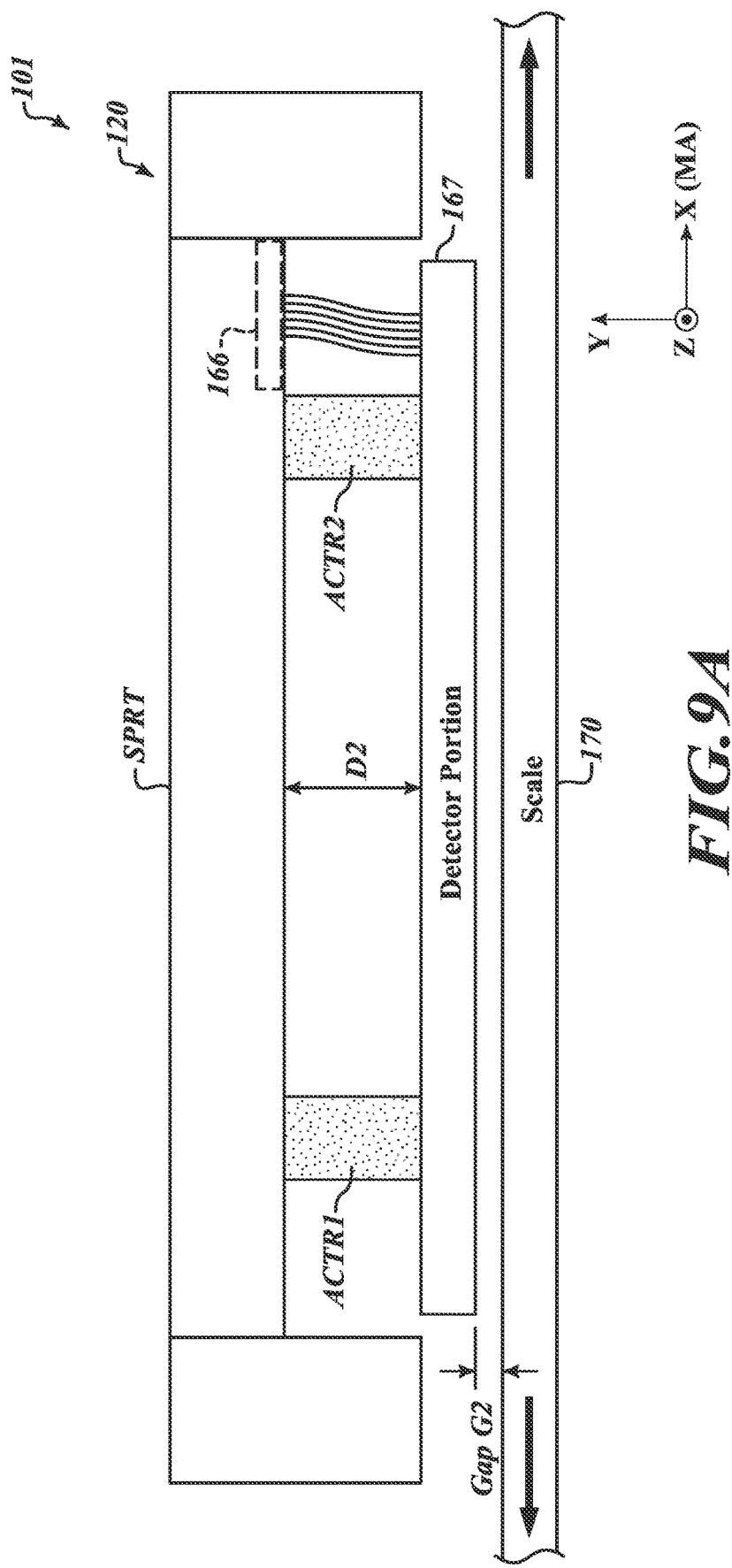
FIGS. 9A and 9B are diagrams illustrating operations of the inductive linear encoder of FIGS. 8A and 8B after the actuators have been utilized to adjust the gap between the detector portion and the scale from the first gap size to a second gap size.
Figure 9B:
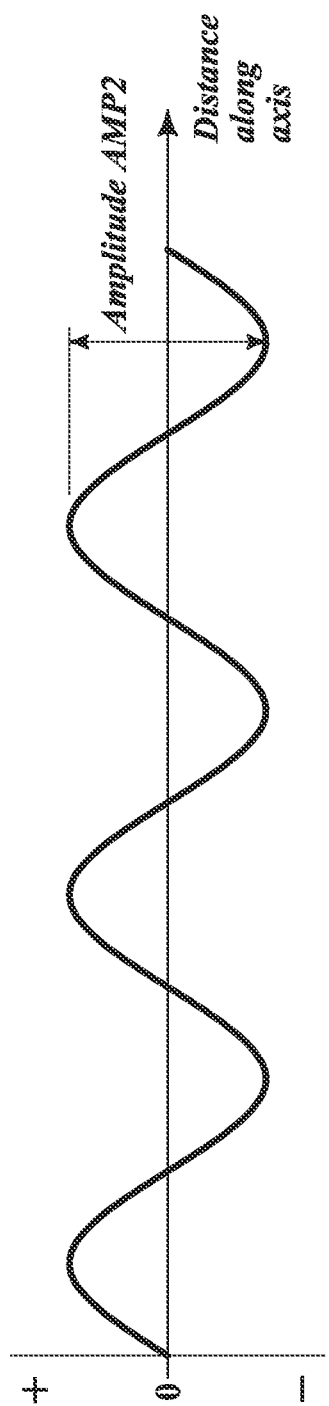

FIGS. 9A and 9B are diagrams illustrating operations of the inductive linear encoder 101 of FIG. 6 after the actuators ACTR1, ACTR2 have been utilized to adjust the gap between the detector portion 167 and the scale 170 from the first gap size G1 as in FIG. 8A to a second gap size G2. As illustrated, the inductive linear encoder 101 includes the readhead 120 including the support portion SPRT, and the actuators ACTR1, ACTR2 are controlled to adjust the distance to achieve a second distance dimension D2 between the support portion SPRT and the detector portion 167, to correspondingly adjust the gap to achieve the second gap size G2 between the detector portion 167 and the scale 170. The second gap size G2 as illustrated in FIG. 9A is less than the first gap size G1 as illustrated in FIG. 8A. FIG. 9B shows how the output amplitude varies with the position of the scale 170 relative to the readhead 120, for which the relative position signal is shown to have a second amplitude AMP2 when the scale 170 and the detector portion 167 in the readhead 120 are separated by the gap having the gap size G2. The amplitude AMP2 corresponding to the reduced gap size G2 in FIG. 9B is greater than the amplitude AMP1 corresponding to the larger gap size G1 in FIG. 8B.

More specifically, comparison of FIGS. 8A and 8B and FIGS. 9A and 9B indicates that, in various exemplary implementations and over at least a certain range of possible positions, the amplitude of detector signals generally increases as the gap between the detector portion 167 and the scale 170 decreases. Thus, in various exemplary implementations, if the amplitude of the detector signals is less than a certain/desired amount, for example, it may be determined to increase the amplitude and, as a result, the one or more actuators ACTR may be controlled to increase the distance (e.g., from the first distance dimension D1 to the second distance dimension D2) so as to correspondingly reduce the gap (e.g., from the first gap size G1 to the second gap size G2), which may correspondingly increase the amplitude of the detector signals (e.g., and correspondingly the amplitude of the relative position signal). In other instances, if the amplitude of the detector signals is more than a certain/ desired amount (e.g., if the signals are saturated), for example, and it is determined to decrease the amplitude, the one or more actuators ACTR may be controlled to decrease the distance (e.g., such as from the second distance dimension D2 to the first distance dimension D1) to correspondingly increase the gap (e.g., such as from the second gap size G2 to the first gap size G1).

FIGS. 10A-10E are diagrams illustrating implementations with actuators ACTR in different relative locations in relation to the detector portion 167 of FIG. 3. FIG. 10A illustrates two actuators ACTR1, ACTR2 having similar locations as those illustrated in FIG. 5 (i.e., at two end locations along the measuring axis direction MA of the detector portion 167). The two actuators ACTR1 and ACTR2 are configured to enable adjustment along at least the z-axis direction.

FIG. 10B illustrates another example in which only one actuator is provided, for z-axis adjustment, at a central location of the detector portion 167 along the measuring axis direction MA. In various implementations, the one actuator ACTR1B may be larger than the actuators used in the other configurations where multiple actuators are provided.

FIG. 10C illustrates an example in which four actuators are provided, for at least z-axis adjustment, of which two actuators ACTR1C and ACTR2C are provided at two end locations of the detector portion 167 along the measuring axis direction MA (along the x-axis direction) and two other actuators ACTR3C and ACTR4C are provided at two end locations of the detector portion 167 along the y axis direction. In some instances, only three actuators may be provided, such as in a configuration with one actuator removed to reduce the number of components. With four or three actuators, it is possible to enable adjustment of at least one of a pitch or roll of the detector portion 167 relative to the scale 170 (e.g., such as by selectively controlling the actuators ACTR1C, ACTR2C, ACTR3C and/or ACTR4C).

FIG. 10D illustrates another example in which four actuators are provided, for at least z-axis adjustment, wherein the four actuators ACTR1D, ACTR2D, ACTR3D and ACTR4D are located at four corners of the detector portion 167 having a generally rectangular shape. As with the example of FIG. 10C, in certain implementations only three actuators may be provided. With four or three actuators, it is possible to enable adjustment of at least one of a pitch or roll of the detector portion 167 relative to the scale 170 (e.g., such as by selectively controlling the actuators ACTR1D, ACTR2D, ACTR3D and/or ACTR4D).

FIG. 10E illustrates another example in which, similar to the example of FIG. 10D, four actuators ACTR1E, ACTR2E, ACTR3E and ACTR4E for at least z-axis adjustment are located at four corners of the generally rectangular detector portion 167. The example of FIG. 10E further includes four additional actuators ACTR5E, ACTR6E, ACTR7E and ACTR8E, for y-axis adjustment, i.e., to adjust the position of the detector portion 167 relative to the scale 170 in the y-axis direction. The four additional actuators ACTR5E to ACTR8E are located proximate to four corner portions of a support portion SPRT provided to support the detector portion 167. For example, the four additional actuators ACTR5E, ACTR6E, ACTR7E and ACTR8E may be coupled to or pressed against the surfaces or side walls of the support portion SPRT around the detector portion 167.

In various implementations, at least some of the actuators may be compliant and/or coupled/mounted in a compliant (e.g., flexible) or movable (e.g., slidable) configuration (e.g., in regard to the four additional actuators ACTR5E, ACTR6E, ACTR7E and/or ACTR8E, the couplings/mountings may be by a flexible element or portion, such as a stiff spring, or else not fixedly attached but pressed against and movable/slidable, such as in relation to the support portion SPRT or the detector portion 167, so as to avoid overly constraining movement by the actuators ACTR1E, ACTR2E, ACTR3E and/or ACTR4E). In some instances, a smaller number of actuators may be provided, with one or more actuators removed to reduce the number of components. With at least some of the actuators (ACTR1E to ACTR8E), it is possible to enable adjustment of at least one of a pitch, yaw, or roll of the detector portion 167 relative to the scale 170.

In addition to the pitch/yaw/roll adjustments, the configuration of FIG. 10E including the four additional actuators ACTR5E, ACTR6E, ACTR7E and/or ACTR8E enables adjustments of position and orientation of the detector portion 167 along the y-axis direction (e.g., as perpendicular to the measuring axis direction MA (e.g., the x-axis direction) and to the gap direction (e.g., the z-axis direction)). This may be advantageous, for example, in case the overall readhead 120 and/or the detector portion 167 is misaligned or tilted with respect to the scale 170. It should be noted that various arrangements of the actuators ACTR as illustrated in FIGS. 10A-10E are non-limiting examples, and further variations of actuator arrangements are possible and suitable for each particular application as will be apparent to those skilled in the art.

Figure 11:
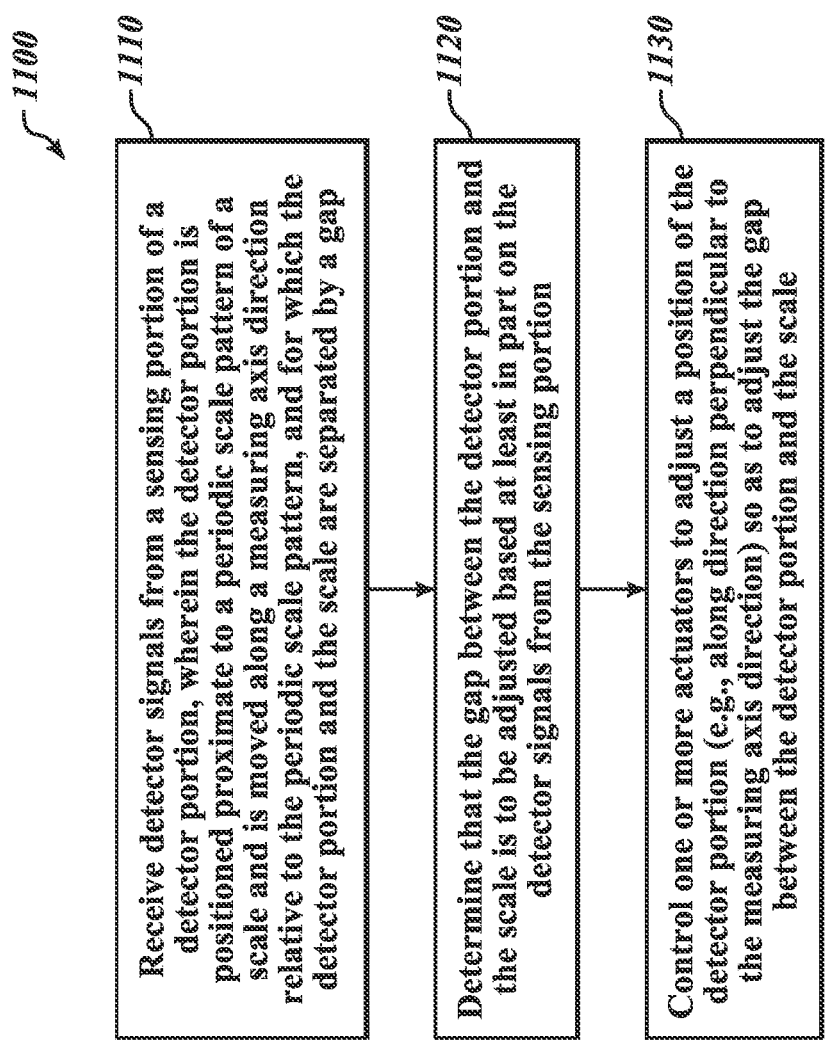
FIG. 11 is a flow diagram illustrating a routine for operating an inductive linear encoder system.

FIG. 11 is a flow diagram illustrating a routine 1100 for operating an inductive linear encoder system 100 configured to measure a relative position between two elements along a measuring axis direction MA. As described above, the inductive linear encoder system 100 includes a scale 170 extending along the measuring axis direction MA which includes a periodic scale pattern 180 comprising signal modulating elements SME, and a detector portion 167. The detector portion 167 includes a field generating portion PRTFGE configured to generate a changing magnetic flux in response to a drive signal, and a sensing portion PRTSEN arranged along the measuring axis direction MA, wherein the sensing portion PRTSEN is configured to provide detector signals which respond to a local effect on the changing magnetic flux provided by adjacent signal modulating elements SME of the scale pattern 180. The inductive linear encoder system 100 also includes one or more actuators ACTR that are coupled to the detector portion 167. The routine 1100 includes generally three steps.

Step 1110 includes receiving detector signals from the sensing portion PRTSEN of the detector portion 167, wherein the detector portion 167 is positioned proximate to the periodic scale pattern 180 of the scale 170 and is moved along the measuring axis direction MA relative to the periodic scale pattern 180, wherein the detector portion 167 and the scale 170 are separated by a gap G. Step 1120 includes determining that the gap G between the detector portion 167 and the scale 170 is to be adjusted based at least in part on the detector signals from the sensing portion PRTSEN. In some implementations, the determining that the gap G is to be adjusted is based at least in part on an amplitude of the detector signals from the sensing portion PRTSEN. For example, if the amplitude of the detector signals is less than a certain/desired amount, a determination may be made to decrease the gap G so as to increase the amplitude of the detector signals. Step 1130 includes controlling the one or more actuators ACTR to adjust a position of the detector portion 167, for example along a direction perpendicular to the measuring axis direction MA, such as along a z-axis direction, so as to adjust the gap G between the detector portion 167 and the scale 170.

Figure 12:
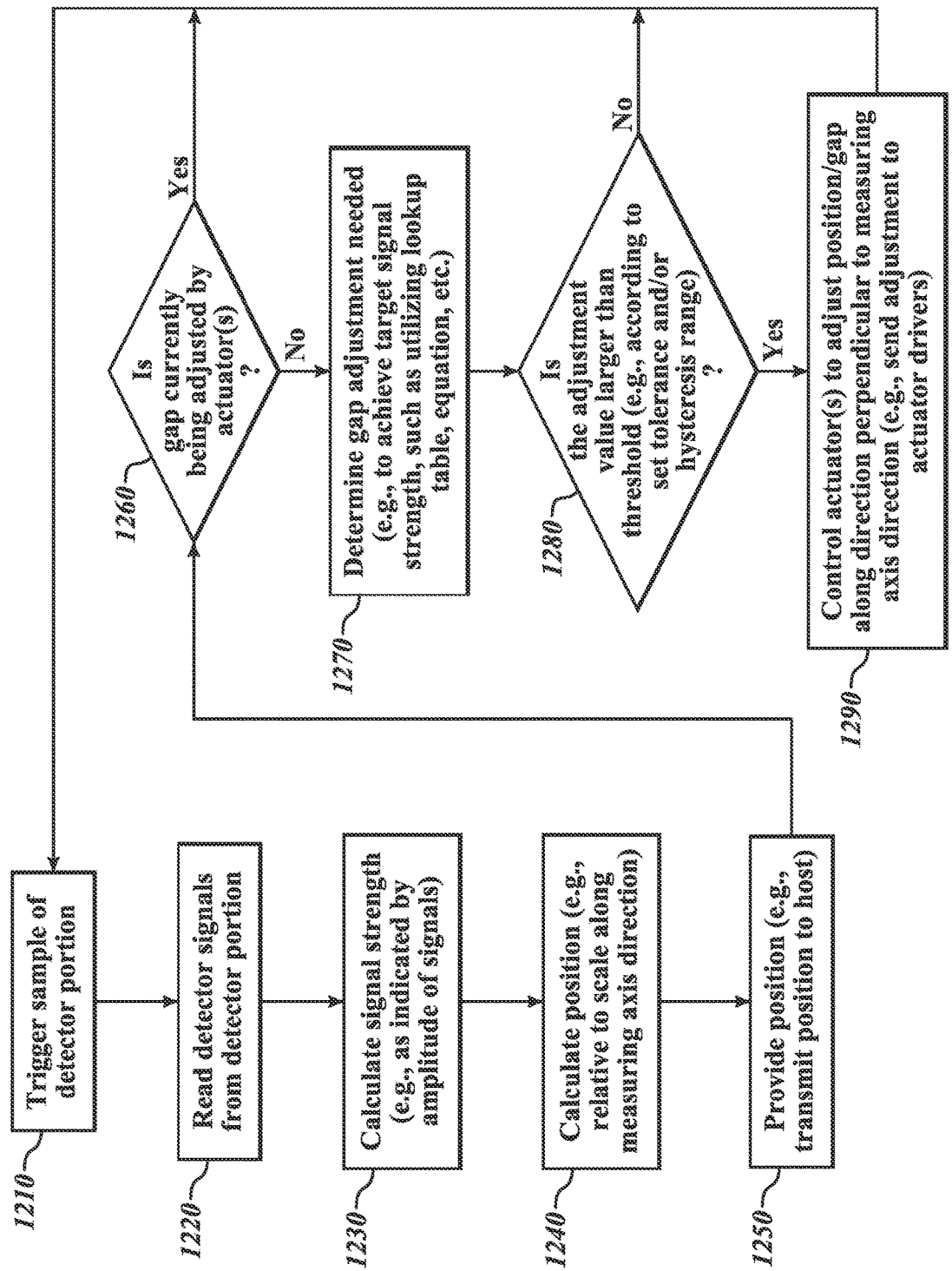
FIG. 12 is a flow diagram illustrating a routine for operating an inductive linear encoder system, including determining a position along a measuring axis direction and determining a gap adjustment needed between a detector portion and a scale.

FIG. 12 is a flow diagram illustrating a routine 1200 for operating an inductive linear encoder system, including determining a position along a measuring axis direction MA and determining a gap adjustment needed between a detector portion 167 and a scale 170. In various implementations, the steps (blocks) 1210-1290 of FIG. 12 may correspond to a more detailed implementation and/or certain additional steps in relation to the steps of FIG. 11. For example, step 1110 of FIG. 11 may at least in part comprise or otherwise be at least in part represented by the more specific steps 1210 and 1220, wherein the receiving of the detector signals in step 1110 may comprise a triggering of a sample of the detector portion 167 in step 1210 and a reading of the detector signals from the detector portion 167 in step 1220.

Similarly, step 1120 of FIG. 11 may at least in part comprise or otherwise be at least in part represented by step 1230 (calculating signal strength, e.g., as indicated by an amplitude of the detector signals) and steps 1260-1280. Specifically, in step 1260, it is determined if the gap between the detector portion 167 and the scale 170 is currently being adjusted by the one or more actuators ACTR. If not, in step 1270, it is determined whether gap adjustment is needed, for example, to achieve target signal strength, such as by utilizing a lookup table, equation, etc. In step 1280, it is determined if the adjustment value (indicative of whether gap adjustment is needed) is larger than a threshold (e.g., according to a set tolerance and/or hysteresis range). If yes, in step 1290, the one or more actuators ACTR are controlled to adjust a position of the detector portion 167 relative to the scale 170 so as to adjust the gap between the detector portion 167 and the scale 170, for example along a direction (e.g., the z-axis direction) perpendicular to the measuring axis direction MA, by sending adjustment control to the actuator drivers ADRV (see FIG. 2).

As such, step 1290 generally corresponds to step 1130 of FIG. 11. If, in step 1280, it is determined that the adjustment value is not larger than the threshold indicating that gap adjustment is not needed, then the routine returns to the initial step 1210. Likewise, if in step 1260 it is determined that the gap is currently being adjusted, then the routine returns to the initial step 1210. In various implementations, step 1260 is included because the mechanical process for the actuators ACTR and corresponding movement may be slower than the sample rate/processing speed for determining the positions along the measuring axis direction MA. That is, the inductive linear encoder system 100 may go through multiple processing cycles during the time it takes for the actuators ACTR to move the detector portion 167 to a determined position for a given gap adjustment.

In certain implementations the routine 1100 of FIG. 11 may further include a step of determining a position along the measuring axis direction MA of the detector portion 167 relative to the scale pattern 180 of the scale 170 based at least in part on the detector signals from the sensing portion PRTSEN, according to the typical use of the inductive linear encoder 101. Similarly, FIG. 12 includes step 1240 of calculating a position relative to the scale 170 along the measuring axis direction MA (e.g., similar to the process described with respect to FIGS. 7A-7C), and step 1250 of providing the calculated position, for example, by transmitting the calculated position to a host system (HST in FIG. 1) or otherwise.

It will be appreciated that the principles disclosed and claimed herein may be readily and desirably combined with various features disclosed in the incorporated references. The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An inductive linear encoder system configured to measure a relative position between two elements along a measuring axis direction, the system comprising:
    a scale extending along the measuring axis direction which includes a periodic scale pattern comprising signal modulating elements;
    a detector portion configured to be positioned proximate to the periodic scale pattern and to move along the measuring axis direction relative to the periodic scale pattern, wherein the detector portion and the scale are separated by a gap, the detector portion comprising:
        a field generating portion configured to generate a changing magnetic flux in response to a drive signal; and
        a sensing portion arranged along the measuring axis direction and configured to provide detector signals which respond to a local effect on the changing magnetic flux provided by adjacent signal modulating elements of the scale pattern;
    one or more actuators that are coupled to the detector portion and are configured to be electronically controlled to adjust a position of the detector portion so as to adjust the gap between the detector portion and the scale; and
    a processing portion that is operably connected to the detector portion and is configured to control the one or more actuators to adjust the gap between the detector portion and the scale, wherein the one or more actuators are electronically controlled based at least in part on the detector signals from the sensing portion which respond to the local effect on the changing magnetic flux provided by the adjacent signal modulating elements of the scale pattern.

2. The system of claim 1, wherein the processing portion is configured to:
determine that an amplitude of the detector signals is to be increased; and
in response to the determination, control the one or more actuators to reduce the gap and correspondingly increase the amplitude of the detector signals.

3. The system of claim 1, wherein the processing portion is configured to determine a relative position along the measuring axis direction of the detector portion relative to the scale pattern based at least in part on the detector signals.

4. The system of claim 1, wherein the detector portion and the scale include planar substrates with corresponding planes and the gap corresponds to a distance between the detector portion and the scale along a direction that is perpendicular to the planes of the planar substrates.

5. The system of claim 1, further comprising a support portion, wherein the one or more actuators are coupled between the support portion and the detector portion such that the one or more actuators are configured to adjust a distance between the support portion and the detector portion.

6. The system of claim 5, comprising a readhead which includes the detector portion, the one or more actuators and the support portion, wherein the readhead is configured to be positioned proximate to the scale and to move along the measuring axis direction relative to the scale.

7. The system of claim 1, wherein the one or more actuators comprise at least a first actuator and a second actuator.

8. The system of claim 1, wherein the periodic scale pattern has a spatial wavelength and has the signal modulating elements of a first type comprising conductive plates or conductive loops that are located along the measuring axis direction corresponding to the spatial wavelength.

9. The system of claim 1, wherein the field generating portion comprises a field generating element surrounding an interior area that is aligned with the periodic scale pattern of the signal modulating elements during operation, wherein the field generating element is configured to generate the changing magnetic flux in the interior area in response to the drive signal.

10. The system of claim 1, wherein the sensing portion comprises a first set of sensing elements arranged along the measuring axis direction, and the sensing elements comprise conductive loops.

11. The system of claim 10, wherein the sensing portion further comprises one or more additional sets of sensing elements arranged along the measuring axis direction, for which each additional set of sensing elements has a spatial phase offset relative to the first set of sensing elements.

12. The system of claim 1, wherein the system is a separate-type inductive linear encoder system with first and second encoder parts that are configured to be coupled to first and second machine parts, respectively, that move relative to one another and for which the separate-type inductive linear encoder system is configured to measure a relative position between the first and second machine parts, wherein the first encoder part includes the scale, and the second encoder part includes a readhead comprising the detector portion and the one or more actuators.

13. The system of claim 1, wherein the one or more actuators are further configured to adjust at least one of a pitch, yaw or roll of the detector portion relative to the scale.

14. The system of claim 1, further comprising one or more additional actuators that are configured to adjust at least one of a pitch, yaw or roll of the detector portion relative to the scale.

15. A method of operating an inductive linear encoder system configured to measure a relative position between two elements along a measuring axis direction, the method comprising:
receiving detector signals from a sensing portion of a detector portion, wherein the detector signals respond to a local effect on a changing magnetic flux provided by adjacent signal modulating elements of a scale pattern of a scale that extends along the measuring axis direction and for which the detector portion moves along the measuring axis direction relative to the periodic scale pattern, and the changing magnetic flux is generated by a field generating portion of the detector portion in response to a drive signal;
determining that a gap between the detector portion and the scale is to be adjusted based at least in part on the detector signals from the sensing portion which respond to the local effect on the changing magnetic flux provided by the adjacent signal modulating elements of the scale pattern; and
controlling one or more actuators that are coupled to the detector portion to adjust a position of the detector portion so as to adjust the gap between the detector portion and the scale.

16. The method of claim 15, wherein the determining that the gap is to be adjusted is based at least in part on an amplitude of the detector signals from the sensing portion.

17. The method of claim 16, wherein a determination that the gap is to be decreased is based at least in part on a determination that the amplitude of the detector signals from the sensing portion is to be increased, for which a controlling of the one or more actuators to adjust a position of the detector portion so as to decrease the gap between the detector portion and the scale correspondingly results in an increase in the amplitude of the detector signals.

18. The method of claim 15, further comprising:
determining a relative position along the measuring axis direction of the detector portion relative to the scale pattern based at least in part on the detector signals.

19. An inductive linear encoder configured to measure a relative position between two elements along a measuring axis direction, the encoder comprising:
a scale extending along the measuring axis direction which includes a periodic scale pattern comprising signal modulating elements;
a detector portion configured to be positioned proximate to the periodic scale pattern and to move along the measuring axis direction relative to the periodic scale pattern, wherein the detector portion and the scale are separated by a gap, the detector portion comprising:
a field generating portion configured to generate a changing magnetic flux in response to a drive signal; and
a sensing portion arranged along the measuring axis direction, wherein the sensing portion is configured to provide detector signals which respond to a local effect on the changing magnetic flux provided by adjacent signal modulating elements of the scale pattern; and
one or more actuators that are coupled to the detector portion and are configured to be electronically controlled to adjust a position of the detector portion so as to adjust the gap between the detector portion and the scale based at least in part on the detector signals from the sensing portion which respond to the local effect on the changing magnetic flux provided by the adjacent signal modulating elements of the scale pattern.

20. The inductive linear encoder of claim 19, wherein the one or more actuators are further configured to be electronically controlled to adjust at least one of a pitch, yaw or roll of the detector portion relative to the scale.

21. The method of claim 15, further comprising controlling the one or more actuators to adjust at least one of a pitch, yaw or roll of the detector portion relative to the scale.

* * * * *